Jan. 7, 1947.   F. E. FREY   2,413,868
REMOVAL OF ORGANIC FLUORINE
Filed Nov. 13, 1943
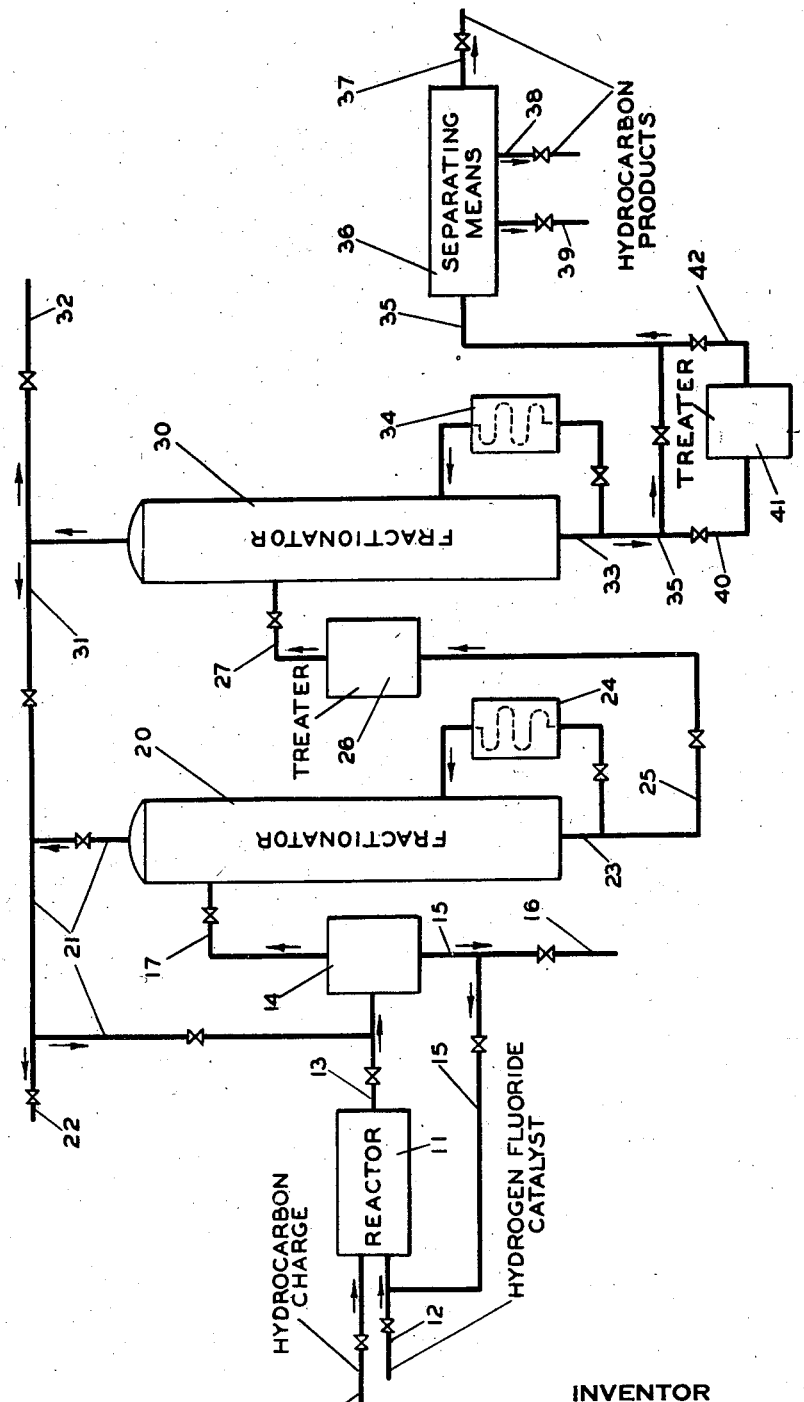
INVENTOR
F. E. FREY
BY *Hudson, Young & Yinger*
ATTORNEYS Patented Jan. 7, 1947

2,413,868

UNITED STATES PATENT OFFICE 2,413,868

REMOVAL OF ORGANIC FLUORINE

Frederick E. Frey, Bartlesville, Okla., assignor to Phillips Petroleum Company, a corporation of Delaware Application November 13, 1943, Serial No. 510,203

10 Claims. (Cl. 260—683.4)

This invention relates to the treatment of organic materials to remove therefrom organic fluorine-containing compounds. In one general embodiment, it relates to the removal, from hydrocarbon materials, of fluorine-containing compounds. In a more specific embodiment, my invention relates to the removal of at least a major portion of organically bound fluorine from hydrocarbon materials containing organically bound fluorine in an amount not greater than 1 per cent by weight, and often in an amount not greater than about 0.1 to about 0.05 per cent by weight. This application is a continuation-in-part of my copending application Serial No. 398,361, filed June 16, 1941, now Patent 2,347,945, issued May 2, 1944.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce motor fuel hydrocarbons in the presence of catalysts comprising one or more of such fluorine compounds as hydrofluoric acid, boron trifluoride, and the like. Although the exact nature or composition of the organic fluorine-containing by-products which may be formed has not been definitely established, they are believed to be predominantly alkyl and/or aryl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

According to the aforementioned co-pending application, organic fluorine compounds may be removed from hydrocarbon materials containing them by contacting such hydrocarbon materials with solid porous contact materials. Contact materials which have been found suitable include those known to be catalytically active for hydrogenation or dehydrogenation reactions, such as alumina gel, Activated Alumina, dehydrated bauxite, chromium oxide, mixtures of alumina and chromium oxide, zirconia, limonite (ferric oxide), calcium oxide, magnesium oxide, and the like, metals of the iron group, especially finely divided nickel deposited on an inert support, and the like. Such contact materials appear to adsorb preferentially the organic fluorine compounds, although the exact mechanism involved is not fully known at present. The hydrocarbon material being treated may be in either the liquid or the vapor phase. Also, according to the aforementioned co-pending application, in a process for alkylating relatively low-boiling alkylatable hydrocarbons in the presence of fluorine compounds, a selected part or all of the hydrocarbon effluent from an alkylating zone may be advantageously subjected to the action of a solid porous contact material to remove organic fluorine compounds.

I have now found that such organic fluorine-containing compounds can be treated to form organic fluorine-free compounds and free hydrogen fluoride under relatively mild conditions in the presence of novel catalytic materials. These novel catalytic materials are prepared by treating various oxides of metals with hydrogen fluoride, or with a material which will release hydrogen fluoride under the conditions used for treating the metal oxide. An especially desirable catalyst results from treating a more or less hydrous oxide of aluminum with hydrogen fluoride at a suitable temperature. Other desirable catalysts can be produced by similar treatment of oxides of iron, chromium, nickel, cobalt, zirconium, molybdenum, titanium, vanadium, manganese, thorium, tungsten, uranium, hafnium, or the like alone or in admixture, synthetically produced or in natural occurring forms, as in ores. When using naturally occurring oxides, such as bauxite, limonite, manganite, baddeleyite, brookite, brucite, diaspore, dysanalite, gibbsite, goethite, hausmannite, huebnerite, ilmenite, lepidocrocite, rutile, spinel, valentinite, etc., it is generally desirable to choose an ore relatively free from substantial amounts of silica, although minor amounts are not deleterious, and often are advantageous, since a more porous granular material results from removal of the silica.

An object of this invention is to effect substantially complete removal of fluorine from hydrocarbon fluids containing organic fluorine compounds as impurities.

A further object of this invention is an improved process for obtaining a substantially fluorine-free alkylate from the alkylation of hydrocarbons in the presence of a catalyst comprising a fluorine compound.

Another object of my invention is to remove organic fluorine compounds from other organic materials.

A further object of my invention is to decompose organic fluorine compounds to release hydrogen fluoride.

Still another object of my invention is to produce an improved catalyst for the decomposition of organic fluorine-containing compounds.

Other objects and advantages of my invention will become apparent, to one skilled in the art, from the accompanying disclosure and discussion.

The catalyst of this invention is prepared by treating a solid granular oxide, such as one herein discussed, with hydrofluoric acid under conditions such that the final material contains a substantial amount of combined fluorine. This treatment is preferably carried out at a temperature between about 50 and about 350° F. One method is to effect a substantial, but not complete, dehydration of the oxide, which generally will be available in a more or less hydrous condition. After such dehydration the oxide may be treated directly with liquid concentrated hydrofluoric acid for a period of several hours. Too short a treatment results in a less active catalyst, too long a treatment often has the result that the original granules disintegrate to the extent that the resulting material has too low a mechanical strength for handling. It is often more convenient to place the granular oxide in the catalyst chamber and to pass through the granular mass a stream of liquid concentrated hydrofluoric acid, or a hydrocarbon stream containing free hydrogen fluoride. As brought out in my previously mentioned copending application Serial No. 398,361, when hydrocarbon materials contaminated with organic fluorine compounds are passed through a granular mass of such an oxide, at a temperature between about 70 and about 550° F., the effluent is substantially fluorine-free. With bauxite I have operated such a process under such conditions until the bauxite contains as much as about 35 or 40 per cent by weight of fluorine, still obtaining satisfactory operation. Bauxite, or other granular oxide material, which has been so used can be employed as a catalyst in the present invention. However, it is generally desirable to give the used oxide material a further treatment with hydrofluoric acid.

The exact results of a treatment of a metal oxide with concentrated hydrofluoric acid is not known, but there is good reason to believe that there is a substantial formation of various complex fluorides. Thus, a mass of granular bauxite was placed in a reaction chamber and liquid butane, saturated with dissolved hydrogen fluoride (about 0.5 per cent by weight of the butane) was passed through the mass at about 180° F. for an extended period. The effluent was free from hydrogen fluoride; the treatment was finally ended when the amount of hydrogen fluoride which had been passed into the bauxite mass was about 180% of that theoretically required to form aluminum fluoride with all the aluminum present in the bauxite, and the effluent was still essentially free from hydrogen fluoride.

One of the preferred catalytic materials is produced from yellowish ferric oxide, either in the form of limonite or that initially formed by the oxidation, with air, of wet iron. One convenient way of preparing this last catalytic material is to fill a treating chamber with scrap iron, wet the surface and pass air through it, at about atmospheric temperature, for a period of time to form a coating of ferric oxide on the surface of the scrap iron, but insufficient to cause extensive sloughing off of the oxide, and finally to treat the material with liquid butane containing dissolved hydrogen fluoride, at about 100 to about 250° F., until a substantial amount of unreacted hydrogen fluoride appears in the butane effluent.

An embodiment of my invention will now be described in connection with the accompanying drawing, which forms a part of this application and which is a diagrammatic flow sheet showing an arrangement of apparatus which may be used in the practice of the process modification of my invention.

A suitable hydrocarbon charge is passed through pipe 10 to reactor 11 and a hydrogen fluoride catalyst is passed through pipe 12 to reactor 11. As previously discussed the invention can be applied to the effluents of any one of a number of processes. Generally, however, the invention will be applied to paraffinic hydrocarbon effluents of an alkylation process or of an isomerization process. When the process is one of alkylation the hydrocarbon charge will comprise a mixture of paraffins and olefins and the reaction conditions maintained in the reactor will be those well known to the art. When the process is one for isomerization of paraffin hydrocarbons the hydrocarbon charge will comprise paraffins to be isomerized and the reaction conditions will be somewhat similar to those known for alkylation so far as temperature, pressure and contact time are concerned. In either event hydrogen fluoride may be the essential catalyst and, if desired, may be promoted by from about 1 to about 10 per cent by weight of boron trifluoride. Effluents of the reactor 11 are passed through pipe 13 to separator 14 wherein separation is effected between hydrocarbon effluents and hydrofluoric acid. The hydrofluoric acid is removed through pipe 15 and may be returned at least in part to the reactor 11. Generally it is desirable to pass a portion of the used catalyst to purification equipment not shown through pipe 16.

The hydrocarbon material, generally in liquid phase and containing a minor amount of dissolved hydrogen fluoride, is passed from separator 14 through pipe 17 to fractionating means 20. From fractionating means 20 dissolved hydrogen fluoride and boron trifluoride, if such has been used, is removed by distillation as a low-boiling fraction, generally accompanied by a sufficient amount of a low-boiling paraffin hydrocarbon to form a minimum boiling azeotropic mixture therewith. This low-boiling fraction is removed through pipe 21 and may be returned to pipe 13 and separator 14. If light gases tend to accumulate in the system any desired portion or all of this fraction may be discharged from the system through pipe 22. A kettle product is removed from fractionating means 20 through pipe 23 and a portion is passed through heater 24 and returned to the bottom of the fractionator 20 to supply heat thereto. A further portion of the kettle product is removed from pipe 23 through pipe 25 and passed through treater 26. Treater 26 will contain a metal oxide which has been treated with hydrogen fluoride as discussed more fully herein. The hydrocarbon material charged through pipe 25 will be essentially free from hydrogen fluoride, but will contain small amounts of organic fluorine compounds. As previously mentioned the amount of fluorine present will generally not exceed about 0.1 per cent by weight of the hydrocarbon material, and often will be much less than that. This hydrocarbon material is passed through treater 26 under reaction conditions such that a major part of the organic fluorine compounds, generally at least about 75 per cent or more, is decomposed to free hydrogen fluoride and fluorine-free organic compounds. A reaction temperature suitable for this decomposition can generally be found between about 150 and 750° F. Quite often the temperature of the kettle product from fractionating means 20 will be adequate as a reaction temperature in treater 26 so that no additional heating equipment need be used.

Effluents of treater 26 containing free hydrogen fluoride formed therein are passed through pipe 27 to fractionating means 30 and the hydrogen fluoride is distilled as a low-boiling fraction. This low-boiling fraction will generally contain also a sufficient amount of a low-boiling hydrocarbon to form an azeotropic mixture with the hydrogen fluoride, and passed through pipe 31 to pipe 21. If desired a portion or all of this fraction may be discharged from the system through pipe 32. A kettle product is removed from the bottom of fractionating means 30 through pipe 33 and a portion thereof may be passed through heater 34 and returned to the bottom of fractionating means 30. A further portion of this kettle product is removed from pipe 33 and passed through pipe 35 to separating means 36 wherein various desired product fractions, recycle fractions, and the like are removed and recovered through pipes 37, 38, and/or 39.

If desired, or found necessary, in any particular case the kettle product from fractionating means 30 recovered through pipe 35 may be subjected to further treatment to remove any residual fluorine-containing compounds. This treatment may be conducted in accordance with my hereinbefore mentioned application Serial No. 398,361, now Patent 2,347,945. Thus a part of all of a stream passing through pipe 35 may be removed through pipe 40 and passed through treater 41 and subsequently returned with a substantially smaller or negligible amount of fluorine through pipe 42 to pipe 35 and separating means 36. In many instances, as when treating the effluent of an alkylation process the treatment in treater 41 can be effected by contacting the hydrocarbon material with hard granular bauxite at a temperature between about 100 and about 250° F. for a time such that the effluents are essentially fluorine-free. After bauxite used in treater 41 has become so saturated with fluorine that satisfactory operation is no longer obtained the bauxite may be used to decompose organic fluorine compounds in treater 26. Before being used in treater 26 it may be found desirable to subject the used bauxite to treatment with hydrogen fluoride as elsewhere herein discussed.

It will be readily appreciated that the drawing illustrates only one method of practicing my invention. Another method which involves the use of only a single fractionating means is to incorporate the treater 26 between the heater 24 and the bottom of fractionator 20 so that fractionator 20 serves to remove hydrogen fluoride contained in the charge entering through pipe 17 and hydrogen fluoride formed in the treater. Another method of practicing my invention in connection with a single fractionating means is to remove a portion of the liquid hydrocarbon material from an intermediate zone in the fractionating means, as from one of the intermediate bubble trays, pass this material through a treater such as treater 26 and return the effluents of the treater to a lower part of the same fractionating means. Such methods of operation are more fully disclosed and claimed in the copending application of Ralph C. Cole, Serial No. 510,175, filed November 13, 1943.

It will be readily appreciated by those skilled in the art that the drawing illustrates the use of conventional equipment which is not shown in detail, and that much conventional equipment such as heaters, coolers, condensers, reflux equipment, pumps, compressors, catalyst chambers and the like will be necessary in the practice of any specific embodiment of my invention and can readily be adapted by one skilled in the art in the light of the teachings and discussion presented herein.

As an example of the preparation of the catalyst of my invention, and of its use, hard granular bauxite, which had been used to remove organic fluorine from hydrocarbon effluents of a commercial unit for alkylating isobutane using liquid hydrofluoric acid, was treated with liquid hydrogen fluoride, at room temperature, for two hours. At the end of this time there was little change in the general physical appearance of the bauxite, except that a small amount of fine, powdery material had become separated from it. The resulting granular material was then treated for two weeks at about 180° F. with a stream of liquid butane saturated with dissolved hydrogen fluoride, about 0.5 per cent by weight; the flow rate was between about 2 and 4 liquid volumes per volume of bauxite per hour. After several days the mass of bauxite became plugged; the mass was removed and crushed, and again placed in the chamber for the rest of the treatment. After this two weeks of treatment the resulting granular mass was used as a catalyst to decompose organic fluorine compounds present in the effluent from a paraffinic stream effluent from an alkylation plant using hydrofluoric acid as the catalyst. This stream, from which free hydrogen fluoride had been removed by distillation, was passed through the catalyst mass until the system was at equilibrium. After equilibrium had been reached, the following data was obtained:

| Feed | | | | Effluent | | |
|---|---|---|---|---|---|---|
| Organic fluorine, weight percent | Free HF as fluorine, weight percent | Temperature °F. | Space velocity, liq. vol./ vol. cat./hr. | Organic fluorine, weight percent | Free HF as fluorine, weight percent | Percent removal of organic fluorine |
| 0.0258 | 0.0033 | 169 | 6.4 | 0.0164 | 0.0177 | 36 |
|  |  | 180 | 6.4 | .0107 | .0174 | 59 |
|  |  | 180 | 6.6 | .0105 | .0199 | 59 |
|  |  | 180 | 4.6 | .010 | .0140 | 61 |
|  |  | 212 | 3.9 | .0084 | .0103 | 60 |
| .037 | .0004 | 210 | 4.4 | .0081 | .0197 | 78 |
|  |  | 212 | 4.5 | .0113 | .0230 | 69 |
|  |  | 212 | 5.0 | .0079 | .0190 | 79 |
|  |  | 181 | 5.4 | .0089 | .0160 | 76 |
|  |  | 181 | 5.1 | .0142 | .0181 | 62 |
|  |  | 181 | 5.9 | .0123 | .0219 | 67 |
|  |  | 181 | 5.3 | .0167 | .0182 | 55 |
|  |  | 181 | 5.5 | .0126 | .0235 | 66 |
|  |  | 181 | 5.4 | .0103 | .0177 | 72 |

As indicated by these data, up to about 80 per cent by weight of the organic fluorine was removed at 212° F. The efficiency and degree of removal is increased by increase in temperature. Treatment at a higher temperature and/or passage of the hydrocarbon material through one or more additional beds of fluorinated bauxite results in substantially complete removal of the organic fluorine and recovery as hydrofluoric acid, which advantageously is returned to the alkylation unit for re-use as catalyst.

It will be readily appreciated that various modifications, and embodiments of my invention may be practiced, by one skilled in the art, by following the teachings of the present disclosure without departing from the spirit thereof or from the scope of the claims.

I claim:

1. In a process for converting hydrocarbons into other hydrocarbons in which a hydrocarbon material to be converted is subjected to conversion in the presence of a concentrated hydrofluoric acid catalyst and in which conversion minor amounts of organic fluorine compounds are incidentally produced, the improvement which comprises recovering from effluents of said conversion a hydrocarbon fraction containing hydrocarbons resulting from said conversion together with minor amounts of organic fluorine compounds produced in and incidental to said conversion, passing said hydrocarbon fraction in the absence of added reactants through a mass of granular catalytic material, resulting from the spending of bauxite during use in a subsequent defluorination operation, at a reaction temperature between about 150 and 750° F. for a time to decompose at least a substantial part of the least stable organic fluorine compounds into hydrocarbons and hydrogen fluoride, removing hydrogen fluoride from effluents of said reaction and passing a residual hydrocarbon fraction containing undecomposed organic fluorine compounds through a mass of granular bauxite at a temperature between about 70 and 550° F. for a time such that extensive chemical changes in said hydrocarbon material itself are not effected and such that the total effluent from said treatment is essentially fluorine-free, and utilizing the resulting granular mass which has become spent in the last operation as said granular catalytic material in the first operation.

2. The process of claim 1 in which said resulting granular mass from the second operation is treated with a liquid paraffinic hydrocarbon stream containing dissolved hydrogen fluoride prior to its use as said granular catalytic material in the first operation.

3. A process for treating hydrocarbon materials to remove organically combined fluorine therefrom, which comprises subjecting a hydrocarbon material containing a minor quantity of organically combined fluorine to the action of a granular product, resulting from treating bauxite with a solution of hydrogen fluoride in a liquid paraffinic hydrocarbon stream at a temperature between about 50 and about 350° F. for a time such that said bauxite takes up substantially more hydrogen fluoride from said hydrocarbon solution than stoichiometrically corresponds to the aluminum in the bauxite, at a reaction temperature and for a time such that extensive chemical changes in said hydrocarbon material itself are not effected and such that organic fluorine compounds are decomposed to fluorine-free compounds and free hydrogen fluoride.

4. A process for treating hydrocarbon materials to remove organically combined fluorine therefrom, which comprises subjecting a hydrocarbon material containing a minor amount of organically combined fluorine to the action of a granular product, resulting from treating with a solution of hydrogen fluoride in a liquid paraffinic hydrocarbon stream a hydrous oxide of a metal of the class consisting of aluminum, titanium, zirconium, hafnium, thorium, vanadium, chromium, molybdenum, tungsten, uranium, manganese, iron, cobalt, and nickel at a temperature between about 50 and about 350° F. for a time such that said oxide takes up substantially more hydrogen fluoride from said hydrocarbon solution than stoichiometrically corresponds to the metal in said oxide, at a reaction temperature and for a time such that extensive chemical changes in said hydrocarbon material itself are not effected and such that organic fluorine compounds are decomposed to hydrocarbons and free hydrogen fluoride.

5. A process for treating hydrocarbon materials to remove organically combined fluorine therefrom, which comprises subjecting a hydrocarbon material containing a minor amount of organically combined fluorine to the action of a granular product, resulting from treating with a solution of hydrogen fluoride in a liquid paraffinic hydrocarbon stream a hydrous oxide of aluminum at a temperature between about 50 and about 350° F. for a time such that said oxide takes up substantially more hydrogen fluoride from said hydrocarbon solution than stoichiometrically corresponds to the metal in said oxide, at a reaction temperature and for a time such that extensive chemical changes in said hydrocarbon material itself are not effected and such that organic fluorine compounds are decomposed to hydrocarbons and free hydrogen fluoride.

6. A process for treating hydrocarbon materials to remove organically combined fluorine therefrom, which comprises subjecting a hydrocarbon material containing a minor amount of organically combined fluorine to the action of a granular product, resulting from treating with a solution of hydrogen fluoride in a liquid paraffinic hydrocarbon stream a hydrous oxide of iron at a temperature between about 50 and about 350° F. for a time such that said oxide takes up substantially more hydrogen fluoride from said hydrocarbon solution than stoichiometrically corresponds to the metal in said oxide, at a reaction temperature and for a time such that extensive chemical changes in said hydrocarbon material itself are not effected and such that organic fluorine compounds are decomposed to hydrocarbons and free hydrogen fluoride.

7. A process for treating hydrocarbon materials to remove organically combined fluorine therefrom, which comprises subjecting a hydrocarbon material containing a minor amount of organically combined fluorine to the action of a granular product, resulting from treating with a solution of hydrogen fluoride in a liquid paraffinic hydrocarbon stream a hydrous oxide of chromium, at a temperature between about 50 and about 350° F. for a time such that said oxide takes up substantially more hydrogen fluoride from said hydrocarbon solution than stoichiometrically corresponds to the metal in said oxide, at a reaction temperature and for a time such that extensive chemical changes in said hydrocarbon material itself are not effected and such that organic fluorine compounds are decomposed to hydrocarbons and free hydrogen fluoride.

8. A process for preparing a catalytic material, which comprises subjecting hard, granular bauxite to treatment with a solution of free hydrogen fluoride in a liquid paraffinic hydrocarbon stream at a temperature between about 50 and about 350° F. for a time such as to effect a taking-up, by the bauxite, of substantially more hydrogen fluoride than stoichiometrically corresponds to the aluminum in the bauxite.

9. A process for preparing a catalytic material, which comprises subjecting a hard granular oxide of a metal of the group consisting of aluminum, titanium, zirconium, hafnium, thorium, vanadium, chromium, molybdenum, tungsten, uranium, manganese, iron, cobalt and nickel to treatment with a solution of free hydrogen fluoride in a liquid paraffinic hydrocarbon stream at a temperature between about 50 and about 350° F. for a time such as to effect a taking-up, by the oxide, of substantially more hydrogen fluoride than stoichiometrically corresponds to the metal in the oxide.

10. A process for treating a hydrocarbon material which contains not more than about 0.1 per cent of fluorine as organic fluorine compounds to remove said fluorine, which comprises passing such a hydrocarbon material into contact with a solid granular material at a temperature and pressure suitable for decomposing said organic fluorine compounds to form hydrogen fluoride, said granular material having been produced by passing a solution of hydrogen fluoride in a liquid paraffin hydrocarbon stream through a mass of granular dehydrated bauxite at a temperature between about 50 and about 350° F. until said bauxite has taken up substantially more hydrogen fluoride than that theoretically required to form aluminum fluoride with all the aluminum present in the bauxite, and subsequently removing hydrogen fluoride so produced from the hydrocarbon material so treated.

FREDERICK E. FREY.